United States Patent
Chang

(10) Patent No.: US 7,065,070 B1
(45) Date of Patent: Jun. 20, 2006

(54) METHOD AND SYSTEM FOR ESTABLISHING A VOICE COMMUNICATION SERVICE FOR BUSINESS TRANSACTIONS AND COMMERCE APPLICATIONS

(76) Inventor: Ifay F. Chang, 3 Louis Dr., Katonah, NY (US) 10536

( * ) Notice: Subject to any disclaimer, the term of this patent is extended or adjusted under 35 U.S.C. 154(b) by 1041 days.

(21) Appl. No.: 09/909,094

(22) Filed: Jul. 20, 2001

Related U.S. Application Data

(60) Provisional application No. 60/219,601, filed on Jul. 21, 2000.

(51) Int. Cl.
  *H04L 12/66* (2006.01)
(52) U.S. Cl. ............... 370/352; 370/395.2; 370/493; 709/203; 709/217; 709/227; 717/124; 717/177
(58) Field of Classification Search .............. 370/352, 370/395.2, 400–408, 493–495; 709/200–203, 709/227–228, 249–253; 717/124–127, 176–178
See application file for complete search history.

(56) References Cited

U.S. PATENT DOCUMENTS

| | | | | |
|---|---|---|---|---|
| 5,715,314 A * | 2/1998 | Payne et al. ............ | 705/78 |
| 5,740,240 A | 4/1998 | Jolissaint | |
| 5,960,411 A | 9/1999 | Hartman et al. | |
| 6,614,781 B1 * | 9/2003 | Elliott et al. ........... | 370/352 |
| 6,681,330 B1 * | 1/2004 | Bradford et al. ........ | 713/200 |
| 6,732,172 B1 * | 5/2004 | House et al. ............ | 709/225 |
| 6,826,695 B1 * | 11/2004 | House et al. ............ | 713/201 |

OTHER PUBLICATIONS

Vinodkrishnan Kulathumani, Voice Over IP : Products, Services, and Issues, http://ftp.netlab.ohio-state.edu/pub/jain/courses/cis 788-99/voip_products/index.html.

I.F. Chang, Open Platform Group-Centric & Network-Centric Information Processing System, IDPT.-vol. 2. pp31-35, Dec. 1996.

Ifay Chang and Li-Chieh Lin, Design and Operation of an Internet Realtime Conference, Group Decision and Negotiation 7, 387-398, 1998 Also in Chapman & Hall, pp. 81-90, 1996.

* cited by examiner

*Primary Examiner*—Brian Nguyen
*Assistant Examiner*—Tri H. Phan

(57) ABSTRACT

A method and a system for establishing a self-owned and self-managed network-based voice communication solution (VCS) for supporting business transactions and commerce applications over the communications network(s) including the Internet and PSTN. The voice communication solution is requested by a merchant or business entity at a computer connected to the Internet by providing (i) information needed for approval and (ii) system configuration for accepting the solution. Through a friendly interactive process with a web server and a solution server, the necessary software for voice communication is downloaded to a merchant's designated computer host, turning it to be a VCS server. Upon activation, the VCS server can support voice over IP (VOIP) communication and connect an incoming call to a telephone via PSTN or a PBX network. The VCS server can receive a VOIP call from anyone at anyplace via an Internet connected voice enabled computer. The caller launches a call agent via the merchant's web page(s) or via a computer desktop interface or via a VOIP phone interface to reach the privately held voice communication server. The server connects the caller to a receiver according to the caller or merchant designated phone number. These phone numbers are designated as e800 numbers and are listed in various e800 directories for public use. Hence the VCS system can convert any local phone number into an e800 number with '800' like properties, serving as a self-owned, self-activated and self-managed network-based voice communication system and solution.

19 Claims, 9 Drawing Sheets

| | |
|---|---|
| Name: | |
| E-mail Address: | |
| Phone Number: | |
| Fax Number: | |
| Mailing Address: | |
| City: | |
| Country (Select) | |
| Zip Code: | |
| Business/Company Name: | |
| Business Address: | |
| Registrant ID (Confirm from E-mail): | |
| Payment Method (Select) | |

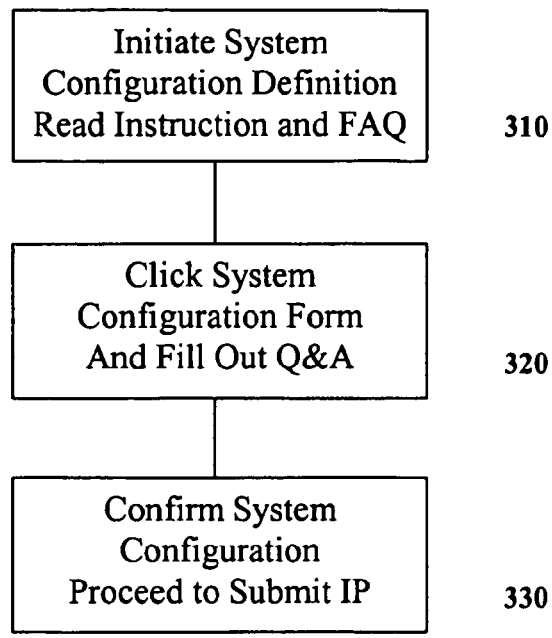

Fig. 5A

| Hardware System and Configuration Specifications |
|---|
| VCS Server: |
| Computer Model, Processor, Internal Memory (32MB+), Disk Storage, Full Duplex Sound Card, Full Duplex Voice Modem, PSTN Phone Jack |
| Call Agent: |
| Computer Model, Processor, Internal Memory (16MB+), Full Duplex Sound Card, Multimedia Speakers and Microphone |
| Software System and Configuration Specifications |
| VCS Server: |
| Operating System (Windows 95, 98, NT or Unix), Full Duplex Sound Card Driver, Full Duplex Voice Modem Driver, VCS Server Program (Version Corresponding to Operating system and Programs Come with It, Such As NetMeeting, 2.x or 3.x) |
| Call Agent: |
| Operating System (Window 95, 98, NT or Unix), Full Duplex Sound Card Driver, Call Agent Program (Version Corresponding to Operating System and Programs Come with It, Such As NetMeeting 2.x or 3.x or up and Web Browser, Internet Explorer, Netscape or AOL) |
| Number of VCS Copies: |
| IP Addresses: |

Fig. 5B     311

| Copy of VCS (IP) | IP Address | DNS Recognized Nickname |
|---|---|---|
|  |  |  |
|  |  |  |

Fig. 6B  411

| Copy of VCS (IP) | CheckMark | Download Checklist |
|---|---|---|
|  |  | VCS Server |
|  |  | Default Ad Image File |
|  |  | Call Agent |
|  |  | Web Icon Instruction File |
|  |  | Web Icon File |
|  |  |  |
|  |  |  |
|  |  |  |

Fig.6C  511

IP, for example, is 12.34.56.089
F(X) is an encryption algorithm which uniquely generates an activation code from the IP
The activation code is imbedded in the VCS Server which will function only after the activation code is entered as an input

METHOD AND SYSTEM FOR ESTABLISHING A VOICE COMMUNICATION SERVICE FOR BUSINESS TRANSACTIONS AND COMMERCE APPLICATIONS

CROSS REFERENCE TO RELATED APPLICATION

This application claims priority from U.S. provisional application 60/219,601 filed on Jul. 21, 2000.

REFERENCES CITED

US Patent Documents:

U.S. Pat. No. 5,960,411 Sep. 28, 1999 Hartman et al. 705/26

U.S. Pat. No. 5,740,240 -/-/1998 Jolissaint, Charles H 379/265

U.S. Pat. No. 5,715,314 Feb. 3, 1998 Payne et al. 380/24

FOREIGN PATENT DOCUMENTS

Other Publications

Sears, Andrew, The effect of Internet Telephone on the Long Distance Voice Market, http://rpcp.mit.edu/~itel/ldeffect.html (background information, no longer available on-line in 2001, replaced with V. Kulathumani)

Kavassalis, Petros, Internet Telephony, Development Paths, Business & Public Policy Issues, http://itel.mit.edu/publications.html (background information no longer available in 2001, replaced with V. Kulathumani)

Chowdhry, Pankaj, Voice Over IP: how it works and why you should care, Internet Computing, May 25, 1998 (background information replaced with V. Kulathumani)

Vinodkrishnan Kulathumani, Voice Over IP: Products, Services and Issues, http://ftp.netlab.ohio-state.edu/pub/jain/courses/cis788-99/voip_products/index.html Chang, I. F., Open Platform Group-Centric and Network-Centric Information Systems, IDPT Conference, Dec. 1–4, 1996

Chang, I. F. and Lin, Li-Chih, An Internet Real-time Conference: Design Experience & Future Application, IFIP Conference, Apr. 9–11, 1996, Chapman and Hall, pp. 81–90,

BACKGROUND OF THE INVENTION

1. Field of Invention

The present invention relates to a method and system for establishing a self-owned and self-activated voice communication solution over a computer network such as the Internet for commerce and/or business use. An automated method enables a merchant to establish such a system easily and flexibly to replace a costly communication service such as the 800 number or 900 number services or the direct line services between two business branch offices.

2. Description of State of the Art

Internet has changed many business practices as well as stimulated many innovative applications. E-commerce is evolving into an environment whereby many new business applications and methodologies are being developed by exploiting new technologies and the powerful communications network capabilities. One of the new technologies being exploited is the voice over IP (Internet protocol) technology (VOIP). The principal advantage of VOIP with its digital packet transmission over IP network is that it allows easy integration of voice and data applications and it requires less bandwidth in carrying out voice communication compared to the conventional telephone service using the PSTN network. The desire to use VOIP for all voice communication has prompted a rush of many new services (different plans and fee structures from telephone companies and carriers such as AT&T, CLEC, etc) and the development of many new communication products (switches, routers and gateways from companies such as CISCO, Lucent, Intel, etc) based on the VOIP technology. These products are generally following the legacy telephone network practice by using proprietary switching and routing equipment to handle massive number of calls rather than allowing the pair of caller and receiver establishing a direct one-on-one connection using an open network such as the Internet.

Despite of a lot of investment, the new developments have not focused on the fundamental problem of providing the basic voice communication needs, especially for commerce and businesses, with a simple, easy-to-use and low-cost solution. Other than the Internet, many commercial networks appear to the consumer public as an extremely complicated infrastructure. Firstly, this complexity is reflected in the difficulties of implementing innovative and/or cost saving applications using the commercial network services. Only large corporations with adequate information system (IS) staff can contemplate network-based application involving integration of voice and data. Small business and merchants are totally at the mercy of the telecommunication service providers. Secondly, this complexity is further reflected in the complication of billing system and billing methods imposed on the consumers for voice communication services by the service providers. Small businesses and merchants have very little understanding of what is being offered. The advertising driven competitive fee for long distance service only created instability and poor quality of service for consumers. For example, the highly demanded 800 number service (now extended to 888, 877 and 866) is still very expensive to the consumer due to the complexity involved (network routing, termination and billing) in providing that service. Another example, the voice communications between global business branch offices is not only costly but also complicated involving too many companies offering and billing such services.

Although there are many patent applications for improving the VOIP technology and developing new products based on it, there is no specific invention dealing with the fundamental needs of the consumers (especially the small businesses)—a self-owned, self managed and low cost solution which allows the caller and the receiver to establish a communication channel directly and easily over the public networks to simply conduct a voice communication or to effectively assist a commerce transaction or business application.

SUMMARY OF THE INVENTION

An embodiment of the present invention provides a method and system for automatically establishing a voice communication solution (VCS) for merchants and businesses. Through an interactive information exchange process on a web site (of the solution provider) which offers the VCS, the solution requester provides requester profile information and establishes the system configuration in which the voice communication solution will be able to function. The web server then directs the download of the VCS program from a solution server onto the merchant's selected computer which is connected to the Internet. Upon completion of the download, the merchant's computer will perform as a VOIP communication server for receiving VOIP calls and terminating the call desired by the caller to an ordinary phone via a modem or a private business exchange.

A set of local phone numbers selected by the merchant can be converted to '800' like numbers since they can be reached throughout the world via web page or an Internet PC or phone using this privately installed voice communication server. These 800 like numbers can be called e800 or i800 numbers and organized into directories called e800 directories for public use. The voice communication servers are called e800 servers; along with e800 directories and e800 call agents (clients), they provide a new system and service replacing today's 800 phone system and services with more usability, lower cost and more innovative applications for e-commerce, such as the branch-to-branch direct communication or a mobile personal Internet phone operator.

The voice communication solution also provides a call agent program which can also be downloaded from a solution server web site. If the service requester wishes to offer the download of the call agent from a designated web site, further interaction with the solution provider web site can receive methods for enabling such download from the merchant's designated web site or alternatively making a link to the solution provider's solution server for the download. The call agent can be downloaded by the public. Hence, the public can call the privately self-owned and self-managed voice communication service if such a service is open to the public. Using the 800 number service as an example, this invention provides a simple replacement for the 800 number service with a low cost (dedicated session of VOIP over long distance) and simple termination method. The "800" service can be turned on and off or scaled up at will by the merchant owner not depending on any legacy infrastructure or systems. The voice communication solution can be easily installed using on-line download and managed by the merchant without dealing with any complicated per-minute billing or service charges. The merchant only needs to maintain an access to the Internet and a local phone line. A merchant can decide to install one or more VCS servers at every branch location, these servers can be used as a private VOIP system to provide branch-to-branch and/or customer-to-branch voice communication by specifying appropriately selected receiver phone numbers in the VCS server program.

The VCS system works under a client-server architecture as call agent to server. As many VCS systems are populated over the Internet and Intranets, they collectively work in a distributed architecture with M call agents calling N servers in a simple easy-to-manage manner E800 numbers with the '800' like functions organized as private e800 directories to be supported by the VCS server program can be easily established by a merchant or a service provider without depending on a complicated telecommunication infrastructure for switching and billing.

BRIEF DESCRIPTION OF THE DRAWINGS

FIG. 5A is a flow chart diagram illustrating how a requester establishes and verifies a correct system configuration on a merchant's computer.

FIG. 5B is one example of the form template used to document the system configuration data.

FIG. 6B illustrates an example of the IP Address template for verification.

FIG. 6C illustrates an example of the checklist including call agent and the VCS server programs.

DETAILED DESCRIPTION OF THE INVENTION

Figure 1:
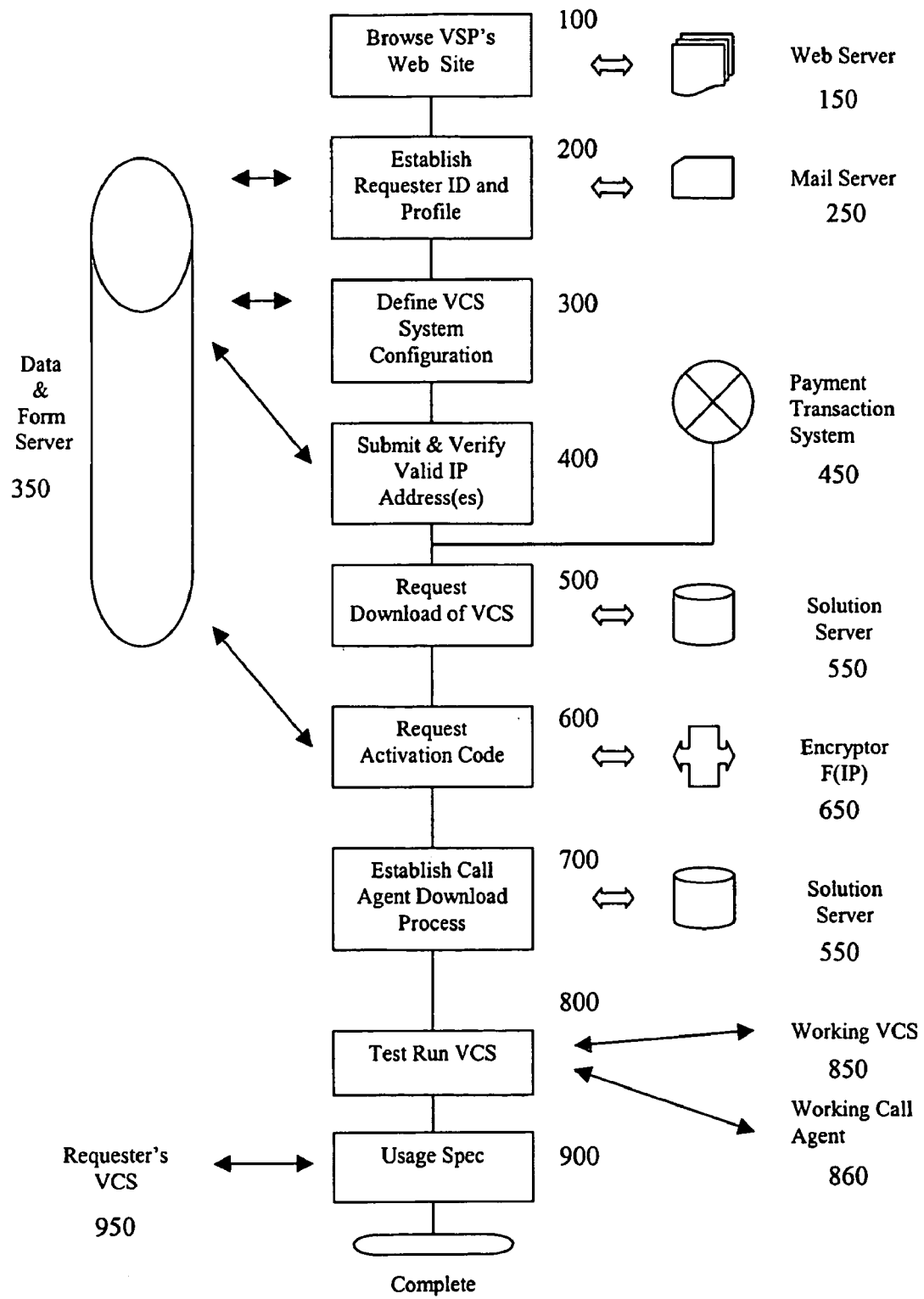
FIG. 1 illustrates the on-line self-installation and self-activation of a voice communication system in one embodiment of the present invention.

The present invention provides a method and system for self-installation and self-activation of a voice communication solution over the Internet. The same method and system can be implemented over an Intranet within an enterprise network following the general methodology described herein. The same method can also be implemented with the CD technology or the VCS can be prepackaged as a turn-key system. However, the on-line method is a more cost effective (less inventory and distribution cost) and customer friendly (no pressure and self serve) system. The self-installation, self-activation and self-test method is named in short as SIA and the voice communication system (or solution) is named in short as VCS in the following text for brevity. VCS refers to the VOIP server and the call agent. The combined name SIA-VCS or separate name SIA and VCS are used to represent the whole or part of the present invention. SIA-VCS provides a convenient method for any merchant or individual to acquire a useful solution to support commerce applications and business transactions at a substantially lower cost than any conventional voice or phone services with added advantages in productivity, convenience, ease of use and simple system management. In addition, SIA-VCS provides the owner of the system the flexibility in turning on and off or expanding for more systems at will without involving complicated dealings with telecommunication companies and their legacy infrastructure. Furthermore, the owner has no need to deal with complicated billings. The owner only needs to maintain Internet access and a phone or PBX access for terminating the incoming calls to his or her designated phone receivers. The owner has the option to keep a record of the calls received from which Internet IP addresses for business planning purposes. With reference to one embodiment of this invention as shown in FIG. 1, a requester of the VCS can start from the web browsing to make a request, to provide identification and user profile, to establish correct system configuration, to submit and verify IP addresses, to automatically download the software, to self-activate and test the software by obtaining activation code after paying for the software through an on-line payment transaction system as one continuous process. This continuous process can be interrupted and resumed with the use of the requester ID code. A requester has the option of acquiring the call agent download procedure to provide such download from the requester designated web site. After installing the system, the requester can then test run the solution, designate a nickname for the server(s) (mapped to the IP addresses) and specify the allowable phone numbers to be supported by the servers in terms of restrictions placed on country code, area code, exchange code or specific phone numbers or extensions. Using this method, businesses can establish their own 800 like services easily and can construct direct VOIP communications between their branch office without complicated procedures.

This continuous online process can be illustrated with an application example to bring out the detailed methods and steps. One application example illustrated here is to request and obtain a voice communication solution to replace an existing 800 number service or to establish an 800 like service. The procedures for this example is as follows: 1. Mr. Blue Spruce visits 800unlimited.com's web site and selects the icon for ordering an e800-2u service. 2. Mr. Spruce furnishes his ID and user profile according to the profile form template (211, FIG. 4B) and receives a requester ID code. 3. Mr. Spruce then works with the configuration form template (311, FIG. 5B) to learn and verify the system configuration needed to install and run the VSC. If Mr. Spruce has difficulty to understand or needs time to add the needed system component, he can suspend the process and come back to it with his requester ID code. 4. Mr. Spruce decides how many e800 systems he wishes to have and what computers with IP addresses are these e800s going to be installed on. He then submits these IP addresses and their nicknames or DNS recognizable names (for example, 800.bluespruce.com mapped with the real IP address, to install the VCS). He then verifies these submissions to the IP form template (411, FIG. 6B). The nicknames can be submitted later after system test run as an option. 5. The system directs Mr. Spruce to a commercial payment transaction system (450, FIG. 1 and FIG. 3A) to arrange for the payment of the software. 6. After completing the payment for the software, he can now request the download of the VCS software by clicking the VCS download button (500, FIG. 1). The software to be downloaded from the solution server (550, FIG. 1) consists of the server (with built in activation verification generated by the encryption engine (650, FIG. 1) from the IP address input), call agent program, ad image file, and merchant web page icon file with installation instruction. 7. When the download is complete, the installation procedure will request Mr. Spruce to enter the activation code, then he requests for the activation code (600, FIG. 1 and FIG. 7A). This step verifies his requester ID, payment status and the IP addresses submitted and retrieves the activation code for each copy of VCS server for each IP address. By entering the correct activation code to each VCS server program, which compares with its built-in activation verification, will then activate the functions of the downloaded VCS server. 8. At this point, Mr. Spruce has the option to install the call agent icon on his own web page by requesting the call agent icon file and following its instructions to modify his HTML code of his web page. The call agent icon appearing on his web page will allow any browser to click the icon and make that e800 call to his receiver. This icon also allows the first time user to download a call agent program onto his PC desktop. (700, FIG. 1) 9. With this done, Mr. Spruce can proceed to test the VCS (800, FIG. 1 and FIG. 8) by clicking the icon from his web page on any PC (other than the PC with the VCS server to be tested) or by launching the call agent from the desktop of a PC with call agent preinstalled. (860, FIG. 1 and FIG. 3A) Mr. Spruce can download a call agent from his web site and use it to call the VCS at the solution provider's site to verify the download process (850, FIG. 1). If the tests were all satisfactory, then Mr. Spruce has established an e800 or 800 like service for his web site or for his business so his customers all over the world can call his business via the VOIP call agent either from Mr. Spruce's web site or from their Internet connected desktops. 10. Mr. Spruce then can assign a nickname for the VCS server IP address and make restrictions on the server as what phone calls will be supported (900, FIG. 1) (specifying country code, area code, and specific numbers). For example, Mr. Spruce's business is selling blue spruce tree seedlings, his e800 service can be named as 800.bluespruce.com (nickname for the IP address) if he has reserved that name for the IP address to be used by the e800 service. Of course, Mr. Spruce can go to the web site to request more e800 services, for example, using pink.dogwood.com as a nickname for another IP address and VCS server and restricting the receiving number to be his partner Mr. Pink Dogwood's office number.

The above illustrative description uses an example to provide an exemplary view of the invention. Further descriptions are given below with reference to specific embodiments thereof. The skilled in the art will be able to envision other modifications possible with the invention.

FIG. 1 illustrates the self-installation and self-activation (SIA) of the VCS. The continuous flow of actions and interactions is represented by block diagrams (100–900) with activity supported by various programs and servers (150–950). With reference to the description and example illustrated above, each block diagram represents a set of actions and is named appropriately with further detailed description in FIGS. 4–8. More detailed description of FIG. 1 will follow the explanation of the network and system architecture shown in FIGS. 2 and 3. With reference to the e800 (Mr. Spruce's case) example above, FIG. 1 also represents an embodiment of a business process of selling 800 like services or replacing the presently expensive 800 number services by VCS. The 800unlimited.com web site or company can act as an e800 registry and as an e800 service provider to serve customers like Mr. Spruce.

Figure 2:
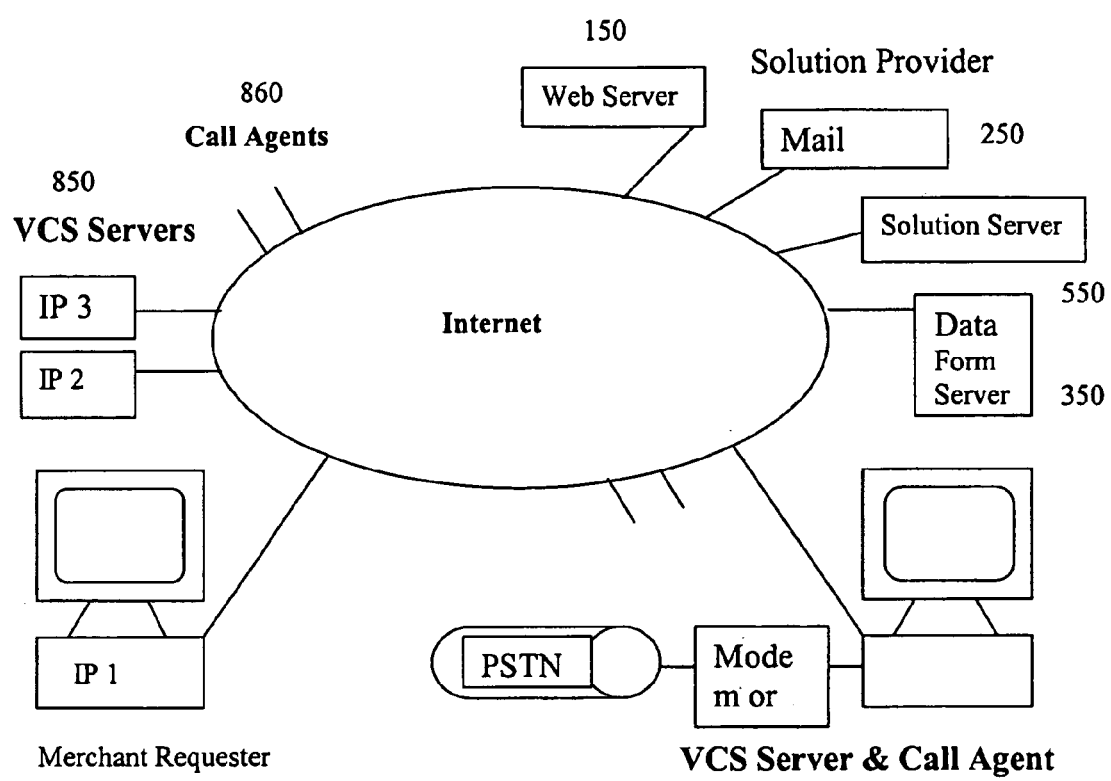
FIG. 2 describes the network and system hardware configuration in one embodiment for enabling the automated installation and testing of a voice communication system.

FIG. 2 describes the general network and system architecture in which the SIA-VCS will work from requesting the VCS solution, installation and activation of the system to the testing and final operation of the VCS. The entire process performs over the Internet as shown schematically with a number of servers supporting the SIA process. The solution provider can elect to place these servers (web, 150 e-mail, 250, solution, 550, dial-up, data and form, 350, servers located at one site on one or more computers or located at distributed sites with a number of computers. A working VCS server, 850, consists of a server computer with an adequate processor of 100 Mhz or faster, 32 MB memory and a VOIP gateway which can receive VOIP calls. The VCS server software module is a program which accepts the VOIP call from a call agent computer, 860, establishes the VOIP session with the call agent and terminates the call to an ordinary phone through a modem or a PBX, 17. In this exemplary drawing, a full duplex sound card and a full duplex voice modem are used in lieu of a VOIP gateway card, then the VCS server software module is programmed to dial the receiver using the modem command. The call agent computer has a call agent program which can initiate a communication session with the server. The call agent provides a user interface to allow data entry and session control. This interface can be launched as a window on the computer screen for use with a mouse or a keyboard. Alternatively, this interface can be implemented on a handheld telephone to achieve the same purposes. In the latter implementation, a wireless or cordless base can be connected to the client agent computer to allow the user to launch and control the call agent remotely.

Figure 3A:
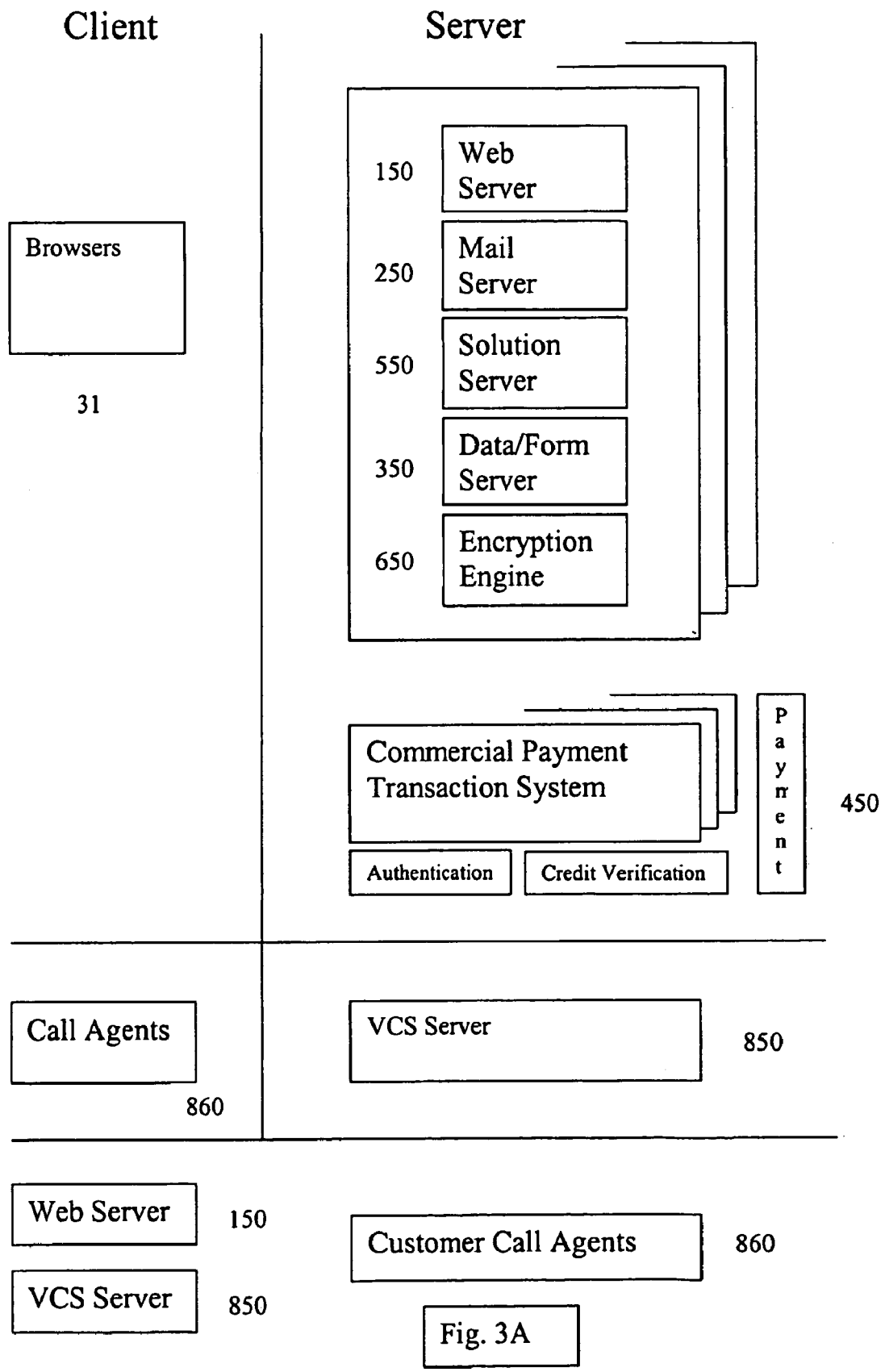
FIG. 3A describes the client-server nature of the software architecture of the method of implementing the invention as illustrated in FIG. 1.

FIG. 3A is the software schematic illustrating the embodiment of the present invention. This embodiment supports the SIA-VCS system operation which works under the client server architecture. The requester uses a web browser as the principal interface to interact with the various servers (150, 250, 350, 450, 550, and 650) to accomplish the processes illustrated in FIG. 1 and FIGS. 4–8, including a commercial payment transaction process, 450. The call agent, 860, and the VCS server, 850, as a pair work like a client-server application. What a requester can accomplish with SIA-VCS is to establish such a client-server application on a merchant's computer via an on-line interactive process to serve the customers all over the world by freely distributing the call agent programs to take advantage of the VOIP technology. It is obvious to those skilled in the art that the various server functions in the SIA-VCS system and process can be implemented on a CD or other storage medium so that the VCS and/or call agent installation can be implemented with a CD like medium rather than from the Internet web site.

Figure 3B:
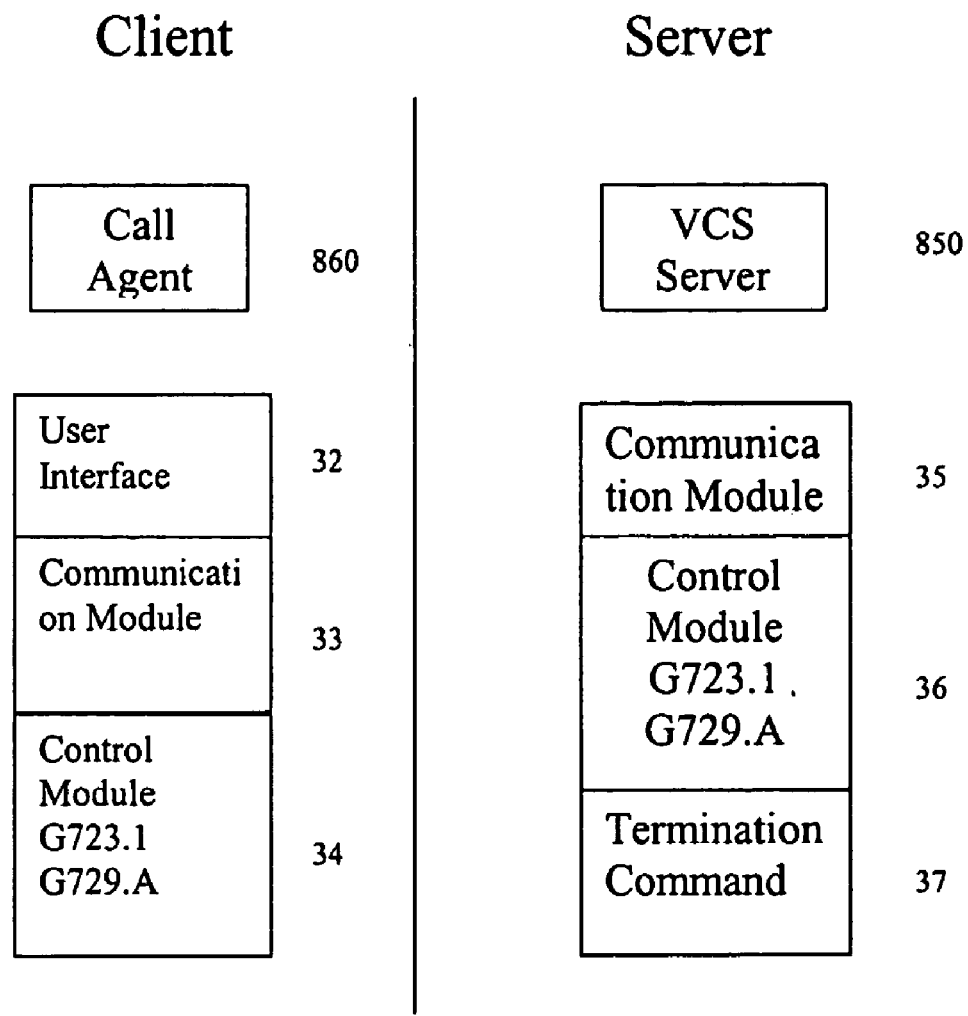
FIG. 3B is a schematic description of the functional components of the server and call agent programs working in the client-server architecture.

FIG. 3B gives a schematic description of the call agent and the voice communication server programs working in the client-server architecture. The call agent, 860, contains a user interface, 32, for inputting the IP address and phone number and making a call, a communication module, 33, for initiating the VOIP session with the server and a voice session control, 34, for interfacing with the sound card and a CODEC program (voice compression and decompression such as GSM, G711, G723.1 and G729.A). The VCS server contains a communication module, 35, to establish communication session with the call agent and to receive VOIP calls, a voice session control module, 36, for interfacing with the sound card and a CODEC program and a termination command, 37, for calling the telephone through a modem or PBX.

Figures 4A, 4B:
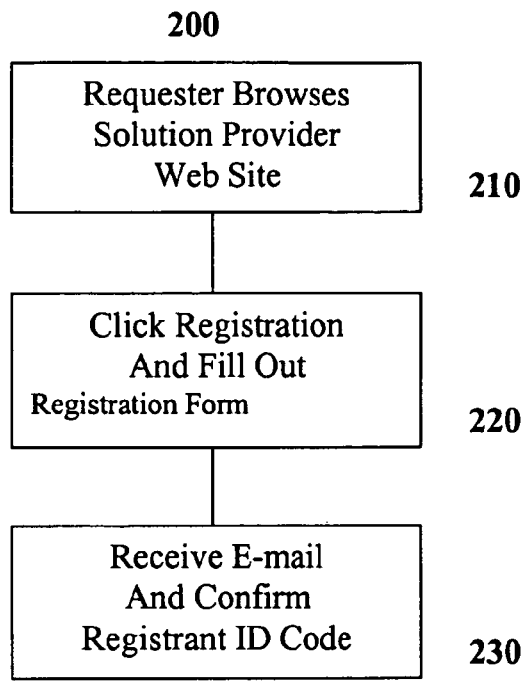
FIG. 4A is a flow chart diagram illustrating how a requester initiates the request.
FIG. 4B is one example of the form template used to establish the requester's ID and profile.

Referring to the flow chart of FIG. 1, The requester, browsing the solution provider's web site (100), is the starting step. The solution provider's web site is served by a web server (150, also shown schematically in FIGS. 2 and 3). The web site contains a series of web pages written in HTML and supported by a number of script programs and servlets to support the actions and interactions illustrated by the block diagrams. A registration button on the web page will lead the requester to the registration process (200) (FIG. 4A). By clicking the registration button, the requester is presented with a registration form template (211, FIG. 4B). During the registration process, an e-mail verification is exercised which is supported by a mail server (250). The next step is to verify system configuration for the VCS (300) (FIG. 5A) where an interactive procedure will require the requester to read the instruction manual and acknowledge comprehension of the system configuration required for VCS to function. (310) The requester is then guided through a configuration form template (320 and 311) (FIGS. 5A and 5B) with the aid of a question and answer file. Upon completion of the system configuration, the requester is guided through to submit the IP addresses needed for the VCS. (330) (FIG. 5A) The submission of the IP addresses will initiate the activation code generation (610) (FIG. 7A) using the encryption engine. (650) (FIG. 7B) At this point, the requester is guided to the on-line payment system (450) (FIG. 1 and FIG. 3) if such a payment method was selected during the registration process. The requester has the option to select different payment methods (211)(FIG. 4B). The requester can suspend the activation process until he receives an on-line confirmation or an e-mail or other form of confirmation of his or her payment. When payment is confirmed, the requester can continue the process by clicking the request for download of VCS. (500, 510) (FIG. 6A) The SIA process first verifies the number of VCS copies requested along with the IP addresses and nicknames submitted (411)(FIG. 6B) then presents the checklist of the download programs and files according to the number of copies requested and the system configuration established for each copy of VCS. The requester then checkmarks the list (511) (FIG. 6C) and confirms the download request. (520)(FIG. 6A) The requester has two options (530, 540) to download the VCS. One is to download to a PC with the designated IP for running the VCS. (530) The other is to download onto a temporary PC for transferring to a working environment later. (540) In the former case, the requester can proceed to request for activation code. (590, 600) In the latter case, the process is suspended. The requester can reenter the process with the registration ID code at a later time. When the requester clicks the request for activation code button which will retrieve the code immediately. (620) (FIG. 7A) The requester then compares and confirms an activation code for each VCS to its corresponding IP address. (630) By inserting the activation code into the VCS server module, it enables the VCS to work for a PC designated with the corresponding IP address. (640) At this point, the requester has an option to request the call agent download service so that the merchant's customers can download a free call agent from the merchant's web site. (800, 810) (FIG. 8) The requester can retrieve the instruction file to understand the procedure involved first (820) then store the call agent file on the merchant's web server computer or another computer with a Uniform Resource Locator (URL). (830) At this point, the requester can install the call agent web icon by modifying the web page HTML code to incorporate the call agent icon. (840) The call agent is a program (860, FIG. 3B) which can initiate a VOIP call with the VCS server. A number of features can be added to the call agent to make it more useful to the users and the merchants. One such feature that can be implemented is to incorporate an advertising window to receive advertising images or animation files. The requester may replace this default ad image file by the merchant's own ad file located on another web host at another URL. (850) With this accomplished, the requester can then test the call agent download procedure from the merchant's web site (860)

In order to fulfill the basic voice communication needs, the call agent only needs to have three functions. One is to initiate a VOIP session with the VCS server by connecting a communication link between the call agent computer (IP address) and the VCS server computer (IP address) using H.323/H.245 or RTP/RTCP protocol or other appropriate protocol. Second function is to handle the VOIP processing using efficient compression code such as G711, GMS, G723.1 and G729.A. The third function is to provide an interface for the caller to enter phone number or IP if needed.

The advertising feature is a simple implementation with HTTP. In the present SIA-VCS system. The VCS server functions are to maintain the communication session, to handle VOIP using the same compression code and to dial and terminate the call through a modem or a PBX. The VCS server module used in the present invention is much simpler than most of other gateways where a search function of finding an appropriate gateway IP address for the called number must be performed. In the present VCS system, the gateway IP for a called number is known ahead of time, hence no need to perform a search. Furthermore, there is no need to have any interaction with any gatekeeper since the VCS provides a dedicated connection giving full bandwidth to one session.

FIGS. 4–8, offer further details of the SIA-VCS system. FIG. 4A illustrates the registration process (200–230) in which a form template (211) shown in FIG. 4B is used. The feature of registrant ID code enables the requester to suspend and reenter the requisition process at any time. This code is confirmed through an e-mail (230) which is either dynamically generated at each time when the requester suspended the requisition process for more security or generated once at the very beginning of the registration process for simplicity. The payment method selection can be implemented with a pull down menu or other selection means to include both credit cards, cyber cash and bank check methods.

FIG. 5A describes the process of establishing system configuration and specification for VCS with one form template example, 311, shown in FIG. 5B, defining hardware and software specifications for both the VCS server and the call agent. A multiple versions of server module and call agent are made available for different system environments, for instance environments with or without firewall protection. Another instance, a version is provided for the environment running without NetMeeting. Yet another instance, versions are provided to run for the environment compliant with H.323 standard or SIP protocol. The requester only needs to click the selection menu provided in the form template, the SIA-VCS system determines the appropriate programs and files suitable for the requester. In the case of more than one copy of VCS are requested, one IP address must be assigned to each copy. The download procedure will not perform unless the IP address is submitted. This is because each copy of VCS server is uniquely coded with an activation code derived from the IP address using the encryption engine (650, FIG. 7B).

Figure 6A:
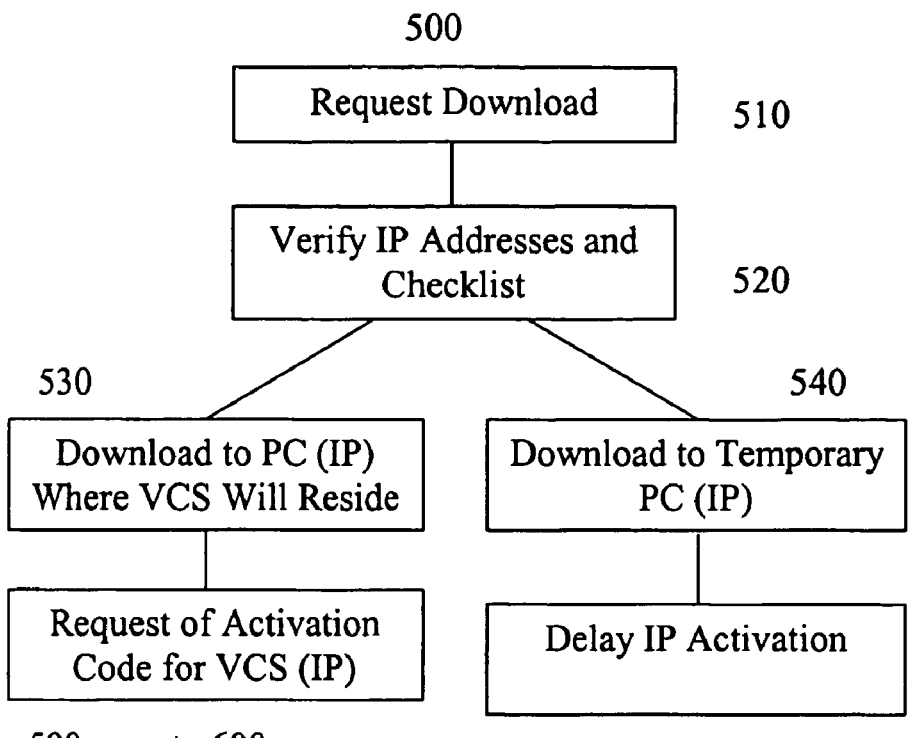
FIG. 6A is a flow chart diagram illustrating the software download process.

FIG. 6A depicts the download process with two options where in one case the download is made to the designated working system with the matching IP address. Once the down load is completed, the requester can continue to perform the activation and testing. Alternatively, the download is made to a temporary system. The solution provider keeps a record of each request on a database with all status information maintained so that requesters can suspend and continue the requisition process at any time. FIG. 6B is a data record example, 411, linking the IP address for each copy of VCS to a recognized URL by the Directory Name Service (DNS). Since the call agent is a generic program which can input any IP address, it is advantageous to use a easily remembered nickname for the IP address. An address book is implemented in one version of the call agent so that the end users can build a directory of useful IP addresses and phone numbers. The call agent can translate the nickname to IP address for the end user. The SIA-VCS system keeps a database on nicknames and DNS recognized names. This database can be useful in supporting a name registration and name search functions. One can expect that services like the e800 can grow rapidly to generate millions of names for the e800 services. FIG. 6C is a data record example, 511, for each download request. After the requester check-marked the download components, the record is kept in the database. These data records can be organized to produce directories for public use for instance in offering e800 services by listing merchants' e800 numbers and VCS IP addresses.

Figure 7A:
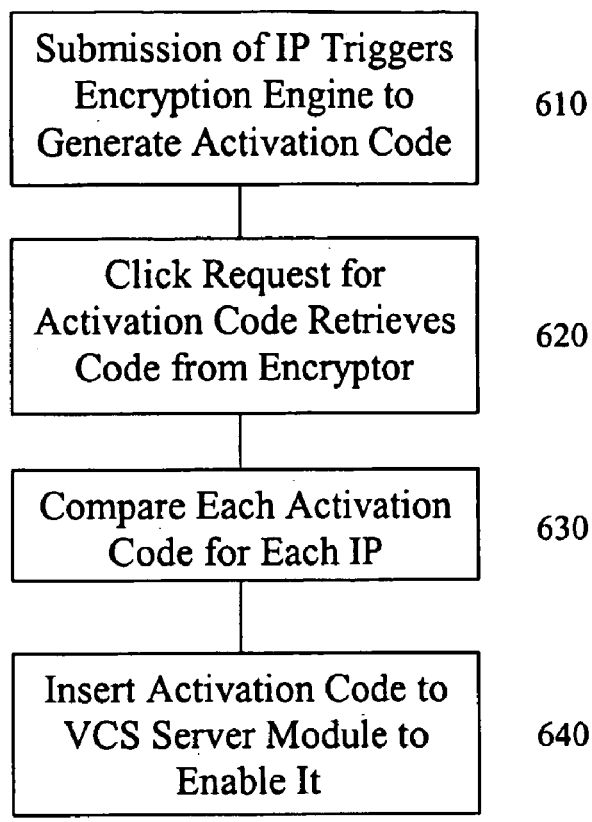
FIG. 7A illustrates the encryption process used to generate the activation code for protecting the VCS server module.
Figure 7B:
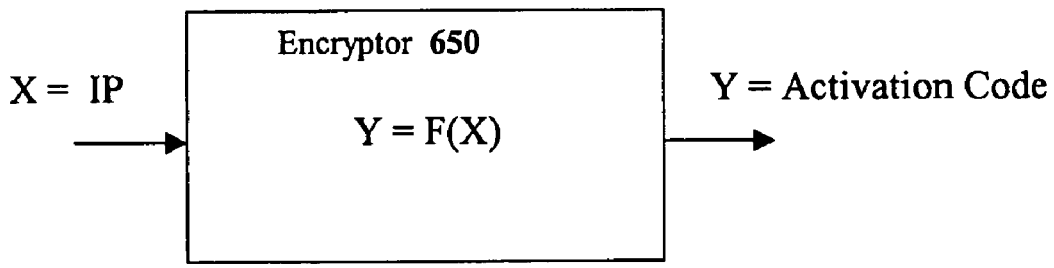
FIG. 7B illustrates the encryption as an algorithm translating an IP address into a unique numerical code using a number of known arithmetic algorithms.

FIG. 7A describes the activation process. (610–640) An encryption engine (650) is used to generate a unique activation code for each copy of VCS. FIG. 7B explains the function of the encryption engine and how it works. A number of known arithmetic algorithms can be used to protect the solution provider in a self-activation process. The algorithm can be replaced periodically according to a secret rule or an algorithm can be selected randomly at the time of request, say a daily schedule. A copy of VCS can not be easily pirated, since it only can work for one specific activation code corresponding to a unique IP address. The call agent is a generic program meant to be distributed to as many users as possible, hence no activation code or protection is necessary.

Figure 8:
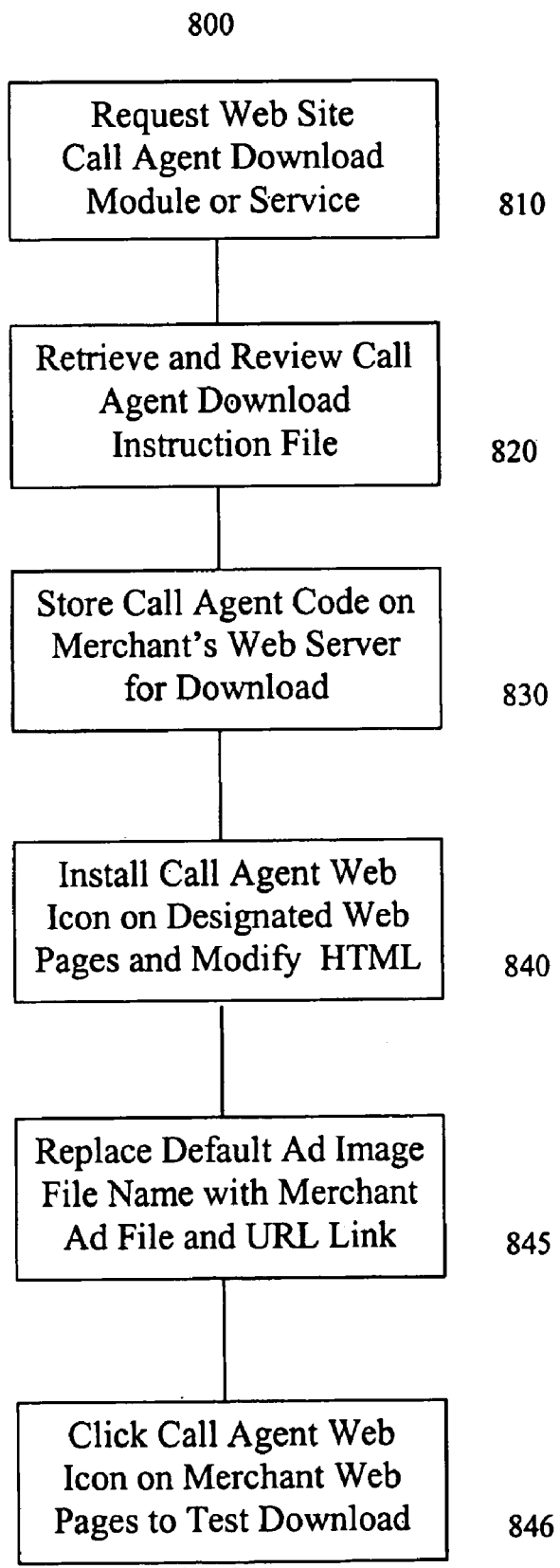
FIG. 8 is a flow chart diagram illustrating the method for establishing call agent download process from the merchant's web site.

FIG. 8 describes how to request and set up a download procedure (800, 810–846) for downloading the call agent from a merchant's web site. This process will enhance the distribution of call agents to customers of all merchants. The difference of the various downloaded call agent program is in the advertising feature and some cosmetics of the interface if desired. The merchant can replace the default ad image file with a commercial ad designed for the merchant. (840) This entire process can be accomplished by the merchant requester following the steps of (840 to 846) with ordinary skills in HTML.

Although the present invention has been described in terms of various embodiments and specific application examples, it is not intended that the invention be limited to these embodiments or applications. Modifications within the spirit of the invention will be apparent to those skilled in the art. For example, if a specific inexpensive hardware gateway card were specified as part of the required system configuration instead of a common voice modem, a corresponding modification of the VCS server software and call agent would be expected. The present invention, is a truly distributed gateway server architecture dedicated to handle direct one-on-one VOIP session. The simple, easy-to-install, easy-to-use and easy-to-manage software server is designed to serve a business entity as small as one individual or as large as an enterprise with a large distribution of such servers. The ultimate situation that every Internet host computer has adopted a voice communication server as described herein, the maximum benefit to the business and commerce community can be realized. An organized directory for listing a large number of phone numbers and IP addresses will make the system efficient for public use. The e800 service example described earlier would be an extremely desirable solution for businesses. It will be also obvious to those skilled in the art, the present invention can find applications in business branch-to-branch communication by simply downloading more VCS servers at two or more branch locations. For such applications, a specific address book containing the multiple branch locations' servers and phone numbers become highly desirable. A modification in the call agent can be made for this application. For such an application, a collective request process involving a number of requesters can be implemented with a common registration ID issued to multiple requesters. The present invention is also attractive to residents who have subscribed the DSL lines with an always-on Internet access. A dedicated server for a residence will bring low cost VOIP calls to the residence or its local neighborhood. Since the cost savings is directly for the callers rather than the receivers, the payment method can be modified to accommodate the situation the payer is different from the person who receives the download. When an enterprise is adopting this distributed Voice communication solution, the multiple requesters at different enterprise locations may have firewalls protecting their local networks. Hence the system configuration can be added with such entries as firewall types and the procedures to set the firewalls to allow VOIP application to pass through them. In an another instance, a frequent traveler may desire to download a VCS onto a notebook computer so that he she may set up a VOIP gateway when reaching different cities. For such a situation, the VCS may have to be activated at each city with a new IP address. A special activation code which expires in short time (24 to 120 hours) can be imbedded in the VCS to accommodate this situation. The owner of such a VCS copy will have to repeat the activation process for each travel with a new IP.

In the foregoing specification, the invention has been described with reference to specific exemplary embodiments thereof. Many changes and modifications can be readily implemented with voice over IP hardware and software devices such as VOIP gateway and VOIP telephone interface or VOIP PBX employing different voice communication protocols such as H.323/H.245, RTP/RTCP or SIP standards. Similarly, various voice compression and decompression codes known as CODECs such as G711, GMS, G.723 or G.729A etc can be used. There are various sound cards and voice modems that can be used in implementing VCS systems and solutions. The schematic diagrams and flowcharts contained herein are grouped and named for ease of understanding, not to be exhaustive or limiting to the present invention. It should be understood that different combinations of the component blocks, rearrangement of the modules and addition of new modules and the like are contemplated as alternative embodiments of the present invention. It is intended that the scope of the invention be defined by what is claimed below.

What is claimed is:

1. An network-based voice communication system, comprising:
    a) at least one voice communication server computer and
    b) at least one call agent computer;
    wherein said serve computer(s) and said call agent computer(s) are interconnected by a computer network;
    said server computer(s) is downloaded with a VOIP server software to receive VOIP calls, and to terminate the calls at an ordinary phone via a termination device; and wherein
    said call agent computer(s) are downloaded with a call agent program to initiate a VOIP session with the said server computer(s) and to allow a caller to input desired data including entering an IP address, selecting one IP address from a directory, entering a telephone number and selecting one telephone number from a directory to facilitate a call;
    said one server computer and said one call agent computer forming a pair and working under a client-server architecture and the pair jointly managing the VOIP session;
    said server computers and said call agent computers forming a cluster of multiple units, working under a distributed architecture;
    wherein said server computer is loaded with the call agent program to function as a call agent computer;
    wherein said call agent computer is loaded with a VCS server program to function as a communication server with the termination device added to facilitate VCS system test and additional application in the category of branch-to-branch voice and data communication; and
    wherein a number of said server/call agent computers are orgnized to perform a tie-line communication function between several branches.

2. A network-based voice communication system in accordance of claim 1, wherein said server computer is equipped with a full-duplex sound card with an appropriate driver supported by the computer operating system for handling digital voice transmission and processing;
    wherein a server software program is programmed to handle a single communication session initiated by said call agent and to handle VOIP traffic with communication interface to a set of standard protocols and voice interface to a sound card to process voice signal, analog to digital and vice versa, and voice compression and decompression using a CODEC module;
    wherein said protocol standards is selected from the family of VOIP communication protocols; and
    is wherein a CODEC code is selected from the family of G723.1, G729, GSM, H261, H263 and G711.

3. A network-based voice communication system in accordance of claim 1, wherein said server computer is equipped with a standards-compliant termination device selected from the family of voice modem, PBX and VOIP gateways with an appropriate driver supported by the computer operating system for handling voice traffic and terminating a VOIP call to a PSTN telephone;
    wherein a server software program is programmed to handle a single communication session initiated by said call agent and to handle the VOIP traffic with communication interface to the standard protocols, voice interface to a sound card to process voice signal, analog to digital and vice versa, and voice compression and decompression using a CODEC module and interface to the termination device; wherein the protocol standards is selected from the family of VOIP communication protocols; and
    wherein a CODEC code is selected from the family of G723.1, G729, GSM, H261, H263 and G711.

4. A network-based voice communication system in accordance of claim 1 wherein said call agent computer is multimedia enabled with a full duplex sound card, two speakers and one microphone for VOIP application;
    wherein said call agent computer is programmed to initiate a communication session with said server computer compliant to the standard communication protocols; and
    wherein said call agent computer is programmed to handle and monitor a voice session with data input, call and hang-up capabilities.

5. A network-based voice communication system in accordance with claim 1 wherein
    said call agent computer has a network interface, a web browser, and an e-mail application compatible with call agent computer operating system for facilitating on-line interaction.

6. A network-based voice communication system in accordance of claim 1 wherein at least one of said server computers is connected to a specific brand of PBX system so to terminate the VOIP call by dialing the PBX system with less than full length of telephone number code;

wherein at least one of said server computers is connected to a VOIP gateway device to terminate more than one voice session at a time; and wherein at least one of said server computers is connected to a voice modem to terminate one dedicated voice session.

7. A method of establishing a working voice communication system with VOIP capability and interfacing with an ordinary phone and designating at least one local phone number as an e800 number into an e800 directory comprising of: an automated process for making a request for downloading voice communication server program and call agent software, under control of a web site supported by a web server and a number of other servers resident in one or more computer servers, displaying information about the voice communication system;

responding to requests of downloading the voice communication system;

capturing the requester identification and user profile;

establishing the system configuration for operating the voice communication system;

accepting and submitting IP addresses for operating the voice communication systems;

downloading a voice communication system server software;

downloading the call agent software;

activating the voice communication system server software; and testing and running the voice communication system;

all in one continuous process with freedom to pause the process;

under the control of a mail server,
authenticating and conveying a ID code of a registrant;
authenticating and confirming payment received;

under control of a solution server,
delivering the voice communication system server software;
delivering a default ad image file;
delivering a call agent software;
delivering a call agent web icon instruction file and web icon file, address book and directory data;

under the control of an encryption engine,
creating an activation code corresponding to an IP address submitted;
delivering the activation code to a requester through the mail server;

under the control of a form server,
allowing forms to be presented to and filled by the requester;

under the control of a network server,
allowing remote dial-in and network connection to perform call agent test, under control of a Voice Communication System server and any number of call agent computers,
performing VOIP call test with a call agent;

whereby the request of establishing a working voice communication system can be accomplished with an on-line process in the end producing a working voice communication system to serve multiple business entities.

8. The method in claim 7
wherein server functions are performed by more than one computer servers with said server functions divided and served.

9. The method of claim 7
wherein the registration step creates a requester ID code for a requester to suspend and resume the requisition process at will;
wherein the activation step creates an activation code to insure said server program from being copied and misused; and
wherein the activation code is set to expire within a specified time, requiring reactivation upon expiration.

10. The method of claim 7
wherein the displaying of information comprising: displaying the voice communication system architecture, system operation procedure, requirement of system configuration, procedures of establishing said voice communication system, personal ID, personal profile, system configuration data, download procedure, server program instruction, call agent program instruction, call agent icon image and instruction and ad image file and instruction;
wherein the download processes comprising: VCS server program, call agent program, ad image file, call agent web icon file, instruction for incorporating web icon file, instruction for replacing ad image file with the ad image file of the merchant's own and the activating VCS system, including information to reset firewall to permit VOIP transmission; and
wherein a number of parties can perform the request, install and any part of said procedures of establishing said voice communication system simultaneously to construct a multi-party VCS solution.

11. The method of claim 7
wherein the activation process comprising the usage of an encryption engine to generate an activation code using a number of known algorithms;
wherein one algorithm encrypts said IP address to produce an activation code;
wherein said download VCS server program is imbedded with a corresponding decryption algorithm with the activation code required for decryption; and
wherein said activation code is a special code which will expire within a specified time, requiring reactivation upon expiration.

12. The method of claim 7
wherein the server software is programmed to allow specific phone numbers to be included in the working directory and to allow large group of phone numbers defined by a specific code comprising country code, area code, specific exchange and the combination of said codes to be included in the working directory; and
wherein the complementary of the working directory, reversing the allowed numbers to be not allowed and vice versa, is easily activated by a reverse action through a program input.

13. A call agent software in accordance of claim 7
wherein said call agent software acts like a browser window which can receive advertising image file or animation file to be displayed in its user interface and wherein said call agent software can accept download of data comprising of address book and directory entries.

14. A call agent software in accordance of claims 7
wherein the call agent software is launched from the call agent computer by means comprising: from web page, from computer screen interface and from an interface of a handheld communication device with its base station connected to the Internet connected call agent computer;

wherein the call agent software contains as address book; and wherein the call agent software contains generic functions not specific to any specific merchant so any merchant can make it downloaded freely from the web page belonging to the merchant.

15. A method in accordance of claims 7 is prepackaged as a turn-key system and is loaded on a storage medium for sales, installation, activation and testing of said voice communication system.

16. An Internet-based e800 directory system comprises:

at least one VOIP gateway computer;

at least one call agent computer; and at least one server computer;

said gateway computer(s) having termination capability for at least one voice session with a PSTN telephone;

said call agent computer(s) being loaded with a call agent program to initiate a VOIP session with the said gateway computer(s) and to allow a caller to input desired data comprising: entering an IP address, selecting one IP address from an e800 directory, entering a telephone number and selecting one telephone number from an e800 directory to facilitate a call;

wherein said server computer having a web server for rendering a web site program to receive request for designating a local phone number to be an e800 number, to list said e800 number in an e800 directory, to display said e800 directory when requested by a requester through a network browser and to facilitate placing a call agent icon next to the e800 number in the e800 directory;

said web server computer being loaded with form server program to provide on-line registration and on-line payment processing for accepting purchase of the e800 directory service; and said web server computer being loaded with file download program to provide instant download of the call agent program, the e800 directory server program and the e800 franchise agreement file.

17. A database in accordance with claim 16 is used wherein the IP addresses and user profile information and other information collected through interactive sessions are incorporated in the e800 directory and the call agent address book, all made available for user to query.

18. The call agent icon in accordance with claim 16 designates the availability of the call agent program by download and signifies the capability to facilitate a direct call to a designated number with a single click when said call agent icon is placed next to the e800 number of the e800 directory on a web page.

19. A method of establishing an automated sale and distribution of e800 number service in accordance of claim 16 comprises of:

making available the Internet-based e800 directory system, downloading the call agent program, designating the local phone number as an e800 number, placing the call agent icon, displaying e800 directory, providing on-line registration, and processing on-line payment;

whereby a requester can submit a local phone number to be designated as an e800 number by paying a registration and subscription fee; and whereby the e800 directory owner can sell the e800 directory service through an on-line process.

* * * * *